United States Patent [19]

Gamino

[11] Patent Number: 5,542,363
[45] Date of Patent: Aug. 6, 1996

[54] SELF LOCKING SEED TUBE

[75] Inventor: Rolando P. Gamino, East Moline, Ill.

[73] Assignee: Deere & Company, Moline, Ill.

[21] Appl. No.: 324,042

[22] Filed: Oct. 17, 1994

[51] Int. Cl.[6] ............................. A01L 7/00; F16L 13/14
[52] U.S. Cl. .................. 111/170; 285/382; 285/382.2
[58] Field of Search .................... 285/382, 382.2, 285/424, 288, 319; 111/170; 403/329, 283

[56] References Cited

U.S. PATENT DOCUMENTS

| | | | |
|---|---|---|---|
| 216,851 | 6/1879 | Hofmann | 285/238 |
| 442,837 | 12/1890 | Ward | 285/319 |
| 599,492 | 2/1898 | Carter | 285/382 |
| 1,160,611 | 11/1915 | Hudson | 285/319 |
| 1,851,404 | 3/1932 | Rose | 285/319 |
| 2,359,117 | 9/1944 | Johnson | 403/283 |
| 3,804,036 | 4/1974 | Seifert, Jr. | |
| 4,064,614 | 12/1977 | Horvath | 285/382 |
| 4,150,466 | 4/1979 | Horvath | 285/382 |
| 5,092,255 | 3/1992 | Long et al. | 111/170 |
| 5,398,981 | 3/1995 | Barton | 285/382.2 |

FOREIGN PATENT DOCUMENTS

| | | |
|---|---|---|
| 3416219 | 11/1985 | Germany . |
| 3701217 | 8/1988 | Germany . |
| 2030 | of 1903 | United Kingdom ................ 285/382 |

*Primary Examiner*—Spencer K. Warnick, IV

[57] ABSTRACT

An agricultural seeding machine is provided with a steel seed tube for directing seed downwardly into a planting furrow and a plastic seed supply tube for directing metered seed into the seed tube. The seed tube has a normal portion for directing seed into the planting furrow and an enlarged portion for receiving the seed supply tube. The enlarged portion is provided with inwardly projecting tangs for gripping and trapping the seed supply tube in the enlarged portion of the seed tube.

4 Claims, 2 Drawing Sheets

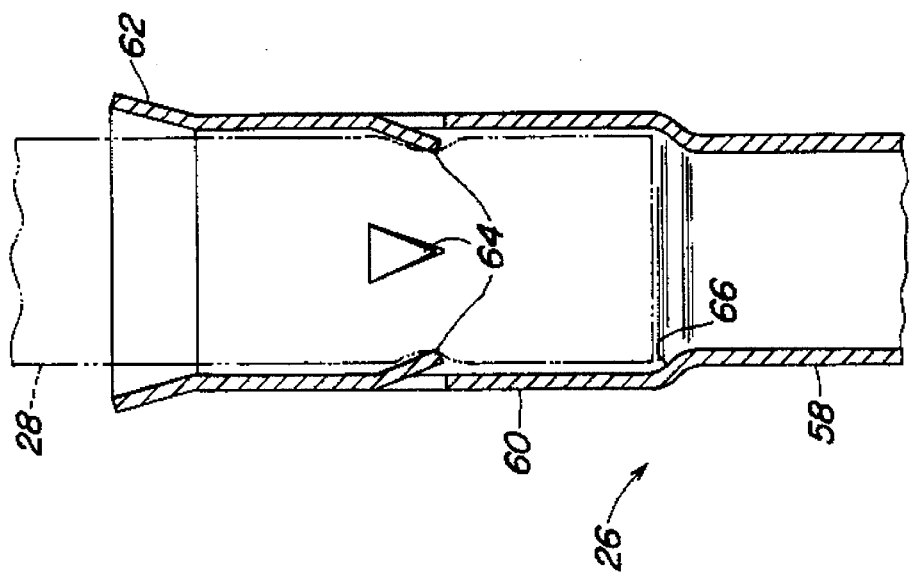
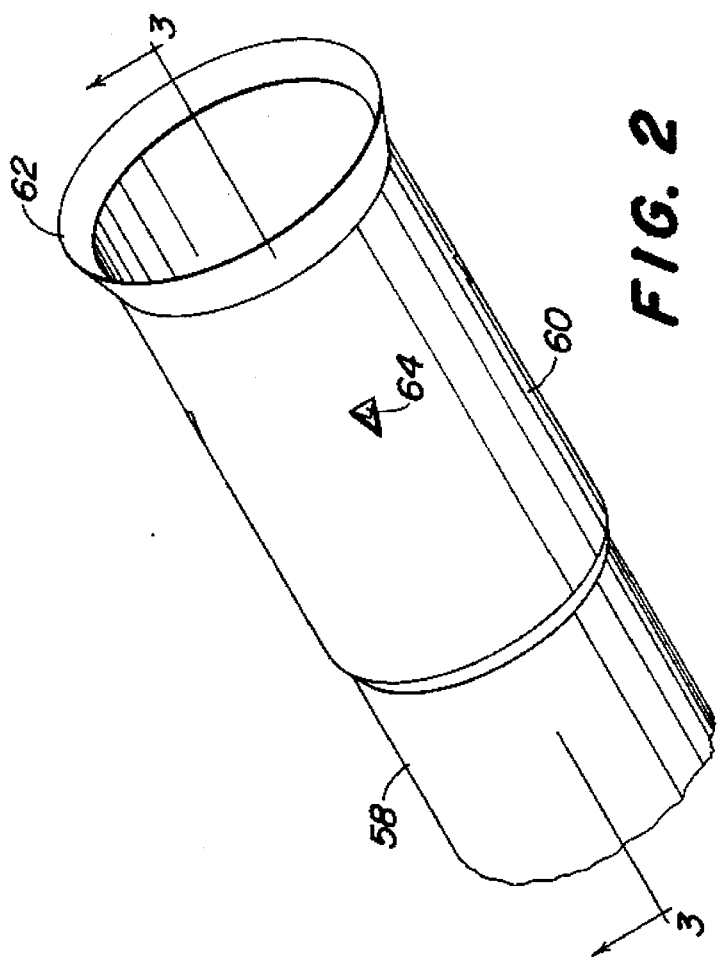

SELF LOCKING SEED TUBE

BACKGROUND OF THE INVENTION

1) Field of the Invention

The present invention is directed to an agricultural seeding machine having a seed tube for directing seed to a planting furrow in which the seed tube can be directly coupled and locked to a seed supply tube.

2) Related Art

With grain drills and planters seed is directed to a planting furrow by a seed tube. The seed tube is coupled to a metering source by a seed supply tube. Currently, the steel seed tube is mounted to a plastic seed supply tube by a flexible rubber hose. The rubber hose is mounted to the tubes by two hose clamps, one for each tube. As such, mounting the seed tube to the seed supply tube requires three additional parts, a short flexible rubber hose and two hose clamps.

SUMMARY

It is an object of the present invention to provide a seed supply tube/seed tube mounting system that does not require any additional parts and simplifies assembly.

The steel seed tube of the present invention is provided with a normal portion for directing the seed to a planting furrow and an enlarged portion for receiving a plastic seed supply tube. The enlarged portion is provided with four inwardly projecting triangular tangs for gripping and trapping the seed supply tube in the seed tube. In mounting the seed supply tube to the seed tube, the assembler jams the seed supply tube into the enlarged portion until it abuts a stop located at the end of the enlarged portion.

BRIEF DESCRIPTION OF THE DRAWINGS

FIG. 2 is a partial perspective view of the enlarged portion of the seed tube.

FIG. 3 is a cross sectional view of the enlarged portion of the seed tube with the seed supply tube shown in phantom.

DETAILED DESCRIPTION

Figure 1:
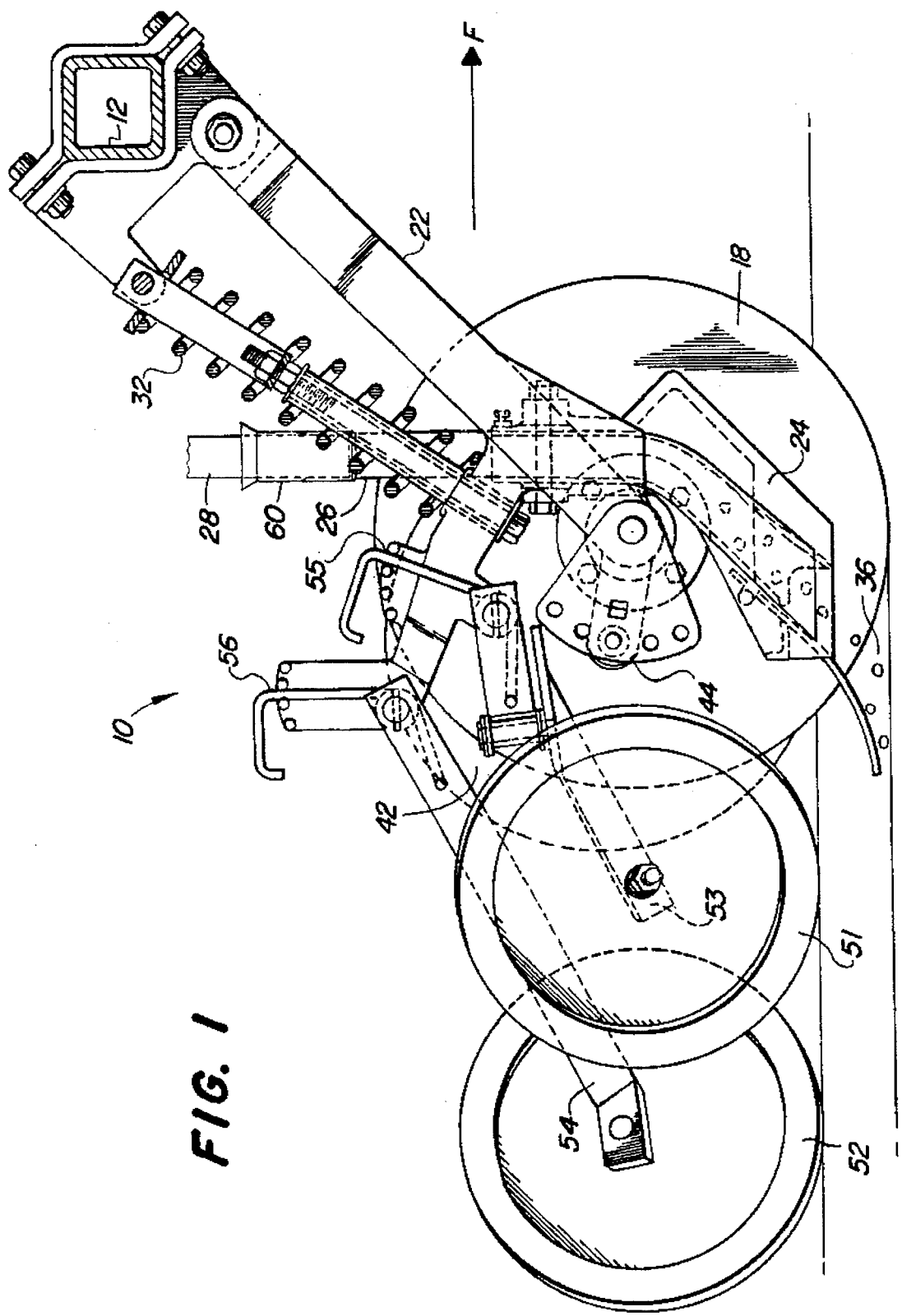
FIG. 1 is a side view of a furrow opener assembly having a self locking seed tube and a seed supply tube coupled thereto.

Referring now to FIG. 1, therein is shown an agricultural seeding machine having a furrow opener assembly 10 supported from a frame member 12 of a grain drill or similar seeding implement adapted for forward movement F over a field. As shown in FIG. 1, the general construction of the furrow opener assembly 10 is of the type shown and described in U.S. Pat. No. 4,760,806 and includes an angled opener disk 18 supported from a drawbar 22 for rotation about an axis angled from the transverse direction. A seed boot 24 is supported closely adjacent the disk 18 in the shadow of the leading edge of the disk. The seed boot 24 is provided with a steel seed tube 26 which is connected to a metered source of seeds (not shown) through a plastic seed supply tube 28.

A down-pressure spring assembly 32 biases the opener disk 18 into the soil to open a furrow, indicated at 36. A depth adjustment wheel 42 is supported for rotation adjacent the leading side of the disk 18 about an axis offset from the axis of the disk. Furrow depth is controlled with an adjustment mechanism 44 which moves the axis of the wheel 42 vertically with respect to the disk 18.

Seed lock wheel 51 and closing wheel 52 are supported rearwardly adjacent the disk 18 from arms 53 and 54, respectively. The seed lock wheel normally runs in the planting furrow for pressing the seeds to the furrow providing good seed-soil contact. The closing wheels crush the side of the furrow thereby covering the seeds and providing a loose layer of soil over the seeds. Seed locking and furrow closing force may be adjusted by down-pressure spring assemblies 55 and 56.

The seed boot 24 is provided with a steel seed tube 26 that extends upwardly above the furrow opener 10. The seed tube is provided with a normal portion 58 for directing seed to a planting furrow formed by the furrow opener and a enlarged portion 60 for coupling the seed tube to the seed supply tube 28. The seed tube 26 is cylindrical with enlarged portion 60 a larger inner diameter than the normal portion 58. The enlarged portion 60 is provided with a funnel shaped opening 62 and four inwardly directed triangular tangs 64. Each triangular tang 64 has an apex that is pointed towards the normal portion 58. The section of the enlarged portion 60 where it necks down to the normal portion forms a stop 66.

The plastic seed supply tube 28 is approximately the same diameter of the normal portion 58 of the seed tube 26. In coupling the tubes to one another, the assembler jams the plastic seed supply tube into the enlarged portion of the seed tube until it contacts stop 66. The inwardly projecting tangs lock the seed supply tube in the seed tube providing a simple and durable connection.

The invention should not be limited by the above-described embodiments but should be limited solely by the claims that follow.

I claim:

1. An agricultural seeding machine having a furrow opener for forming a planting furrow, the seeding machine comprising:

a seed tube having a normal portion and an enlarged portion, both the normal portion and the enlarged portion are cylindrical with the normal portion having a smaller inner diameter than the enlarged portion, the normal portion of the seed tube directs seed downwardly into a planting furrow, the enlarged portion of the seed tube having a funnel shaped opening and a necked down portion adjacent to the normal portion, the enlarged portion between the funnel shaped opening and the necked down portion is provided with inwardly projecting tangs, the tangs are triangular each having an apex that is pointed towards the normal portion; and a seed supply tube mounted in the enlarged portion of the seed tube, the seed supply tube is cylindrical having an outside diameter that is slightly smaller than the inside diameter of the enlarged portion, the necked down portion forming a stop for the seed supply tube, the seed supply tube is trapped in the enlarged portion by the inwardly projecting tangs, the seed supply tube supplying metered seed to the seed tube.

2. A seeding machine as defined by claim 1 wherein the seed tube is made of steel.

3. A seeding machine as defined by claim 2 wherein the seed supply tube is made of plastic.

4. A seeding machine as defined by claim 3 wherein the enlarged portion is provided with four tangs.

* * * * *